US012496854B2

(12) United States Patent
Suzuki et al.

(10) Patent No.: US 12,496,854 B2
(45) Date of Patent: Dec. 16, 2025

(54) TIRE

(71) Applicant: The Yokohama Rubber Co., LTD., Tokyo (JP)

(72) Inventors: Nobuo Suzuki, Kanagawa (JP); Hiroshi Iizuka, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/756,340

(22) PCT Filed: Oct. 19, 2020

(86) PCT No.: PCT/JP2020/039296
§ 371 (c)(1),
(2) Date: May 23, 2022

(87) PCT Pub. No.: WO2021/106429
PCT Pub. Date: Jun. 3, 2021

(65) Prior Publication Data
US 2022/0402303 A1 Dec. 22, 2022

(30) Foreign Application Priority Data
Nov. 27, 2019 (JP) .................. 2019-214588

(51) Int. Cl.
*B60C 9/08* (2006.01)
*B60C 9/00* (2006.01)
(Continued)

(52) U.S. Cl.
CPC .............. *B60C 9/20* (2013.01); *B60C 9/0007* (2013.01); *B60C 9/08* (2013.01); *B60C 11/0008* (2013.01);
(Continued)

(58) Field of Classification Search
CPC ............ B60C 9/0292; B60C 2011/013; B60C 2011/0033
See application file for complete search history.

(56) References Cited

U.S. PATENT DOCUMENTS 4,480,671 A * 11/1984 Giron ...................... B60C 11/01
152/209.27
5,000,239 A * 3/1991 Brayer .................... B60C 11/11
152/209.16
(Continued)

FOREIGN PATENT DOCUMENTS

GB 870161 A 6/1961
JP 1-148604 A 6/1989
(Continued)

OTHER PUBLICATIONS

Machine Translation: JP-3774548-B2, Omoto N, (Year: 2023).*
(Continued)

*Primary Examiner* — Kendra Ly
(74) *Attorney, Agent, or Firm* — Thorpe North & Western

(57) ABSTRACT

In a tire, an inclination angle of a cord included in a second belt layer with respect to a tire width direction is defined as a positive inclination angle in a tire see-through plan view, an intersection point between a perpendicular line drawn from an end portion of a belt layer having a maximum belt width in the tire width direction to a carcass and a cord of an outermost carcass layer in a tire radial direction is defined as a first reference point in a tire meridian cross-sectional view, and an inclination angle of the cord with respect to the tire width direction at the first reference point is −3° or more in the tire see-through plan view.

16 Claims, 6 Drawing Sheets

(51) Int. Cl.
*B60C 9/20* (2006.01)
*B60C 11/00* (2006.01)
*B60C 9/04* (2006.01)
*B60C 11/03* (2006.01)

(52) U.S. Cl.
CPC .............. *B60C 2009/0491* (2013.01); *B60C 2009/2012* (2013.01); *B60C 2011/0016* (2013.01); *B60C 2011/0033* (2013.01); *B60C 2011/0348* (2013.01)

(56) References Cited

U.S. PATENT DOCUMENTS

| | | | | |
|---|---|---|---|---|
| 5,522,442 | A * | 6/1996 | Kishi | B60C 11/01 152/209.27 |
| 6,068,721 | A * | 5/2000 | Dyer | B29D 30/36 156/130.7 |
| 2002/0046796 | A1 * | 4/2002 | Hitotsuyanagi | B29D 30/38 156/130.7 |
| 2004/0069392 | A1 * | 4/2004 | Maruoka | B60C 3/04 152/209.1 |
| 2004/0112493 | A1 * | 6/2004 | Warchol | B60C 11/01 152/209.16 |
| 2005/0006018 | A1 * | 1/2005 | Maruoka | B60C 15/0027 152/543 |

FOREIGN PATENT DOCUMENTS

| | | | | |
|---|---|---|---|---|
| JP | 02144201 | A * | 6/1990 | ............... B60C 9/07 |
| JP | 4-163210 | A | 6/1992 | |
| JP | 05117450 | A * | 5/1993 | |
| JP | 06156014 | A * | 6/1994 | |
| JP | 6-199107 | A | 7/1994 | |
| JP | 6-344719 | A | 12/1994 | |
| JP | 07205611 | A * | 8/1995 | |
| JP | 2000233606 | A * | 8/2000 | |
| JP | 2005-178429 | A | 7/2005 | |
| JP | 2005-280404 | A | 10/2005 | |
| JP | 2005271660 | A * | 10/2005 | |
| JP | 3774548 | B2 * | 5/2006 | |
| JP | 2014-213649 | A | 11/2014 | |
| JP | 2019-085019 | A | 6/2019 | |
| JP | 2019-94024 | A | 6/2019 | |

OTHER PUBLICATIONS

Machine Translation: JP-05117450-A, Nakajima I, (Year: 2023).*
Machine Translation: JP-2005271660-A, Omokawa T, (Year: 2023).*
Machine Translation: JP-07205611-A, Mizutani H, (Year: 2024).*
Machine Translation: JP-02144201-A, Shibata K, (Year: 2025).*
Machine Translation: JP-2000233606-A, Niimura K, (Year: 2025).*
Machine translation: JP-06156014-A, Fujiwara K, (Year: 2025).*

* cited by examiner

TIRE

TECHNICAL FIELD

The present technology relates to a tire with improved uneven wear resistance performance.

BACKGROUND ART

In the related art, uneven wear of a shoulder region of a tread portion of a front tire of a vehicle has been problematic, and measures to reduce the uneven wear have been taken by optimizing tread shapes and tread patterns.

The uneven wear of the tread portion is mainly caused by a tire lateral force generated during traveling and a tire internal structure strain generated during a tire manufacturing process and the like.

The tire internal structure strain refers to a strain generated in the components of a tire during manufacturing or inflation of the tire, and the strain propagates to a tread, causing a strain in the tread itself. The tire internal structure strain is mainly caused by displacement of a carcass cord or a belt cord during manufacturing or inflation of the tire.

Due to the change of the extension direction of the carcass cord during the manufacturing of the tire (during molding of a green tire and during vulcanization) and a tension applied to the carcass cord during the inflation, a carcass deforms toward a side in a tire circumferential direction, and a shear strain is generated. A series of these phenomena causes the strain to propagate to the tread.

For a belt, a shear strain is generated at the end portions of crossed belts during the inflation, and the strain propagates to the tread.

A proposed technique for improving uneven wear resistance performance includes a tire in which cords of a second and a third belt plies among four belt plies are inclined and crossed in opposite directions with each other with respect to a tire axis from a carcass toward a periphery, and the inclination angles of the second and the third belt plies with respect to a tire circumferential direction at a belt end are smaller than those at a tire equator (see Japan Unexamined Patent Publication No. 2019-085019).

The technique disclosed in Japan Unexamined Patent Publication No. 2019-085019 is intended to improve wear resistance performance by determining a belt cord angle or the like. However, as described above, the tire internal structure strain is affected by a shear strain due to a belt cord as well as variations in an extension direction of a carcass cord. Therefore, the technique disclosed in Japan Unexamined Patent Publication No. 2019-085019 has room for improvement in tire components other than the belt cord.

SUMMARY

The present technology provides a tire with improved uneven wear resistance performance.

A tire according to an embodiment of the present technology includes a carcass made of at least one carcass layer and a belt including a first belt layer including a cord extending from an inner side toward an outer side in a tire width direction on one side in a tire circumferential direction and a second belt layer that is disposed on an outer side of the first belt layer in a radial direction and includes a cord extending from the inner side toward the outer side in the tire width direction on another side in the tire circumferential direction. When, in a tire meridian cross-sectional view, an inclination angle of the cord included in the second belt layer with respect to a tire width direction is defined as a positive inclination angle, and an intersection point between a perpendicular line drawn from an end portion of a belt layer having the maximum belt width in the tire width direction to the carcass and a cord of an outermost carcass layer in the tire radial direction is defined as a first reference point, in the tire see-through plan view, an inclination angle of the cord at the first reference point with respect to the tire width direction is −3° or more.

A tire according to an embodiment of the present technology has an improved inclination angle of a carcass cord of the outermost carcass layer, which is adjacent to the belt layer, in the tire radial direction with respect to the tire width direction. As a result, the tire according to an embodiment of the present technology can improve uneven wear resistance performance.

BRIEF DESCRIPTION OF DRAWINGS

FIG. 3A illustrates an example according to an embodiment of the present technology. FIG. 3B illustrates a conventional example.

DETAILED DESCRIPTION

Tires according to embodiments of the present technology (Basic Embodiment and Additional Embodiments 1 to 11 to be described later) will be described in detail with reference to the drawings. Note that these embodiments do not limit the present technology. Constituents of the embodiments include constituents that can be substituted or easily conceived by one skilled in the art or substantially identical constituents. In addition, various modes included in the embodiments can be combined as desired within the scope of obviousness by one skilled in the art.

Basic Embodiment

A tire according to Basic Embodiment of the present technology will be described below. In the following description, a tire radial direction refers to a direction orthogonal to a rotation axis of the tire, an inner side in the tire radial direction refers to a side toward the rotation axis in the tire radial direction, and an outer side in the tire radial direction refers to a side away from the rotation axis in the tire radial direction. In addition, a tire circumferential direction refers to a circumferential direction about the rotation axis as a center axis. Moreover, a tire width direction refers to a direction parallel to the rotation axis, an inner side in the tire width direction refers to a side toward a tire equatorial plane (tire equator line) in the tire width direction, and an outer side in the tire width direction refers to a side away from the tire equatorial plane in the tire width direction. Note that the tire equatorial plane refers to a plane that is orthogonal to the rotation axis of the tire and passes through the center of the tire width of the tire.

Figure 1:
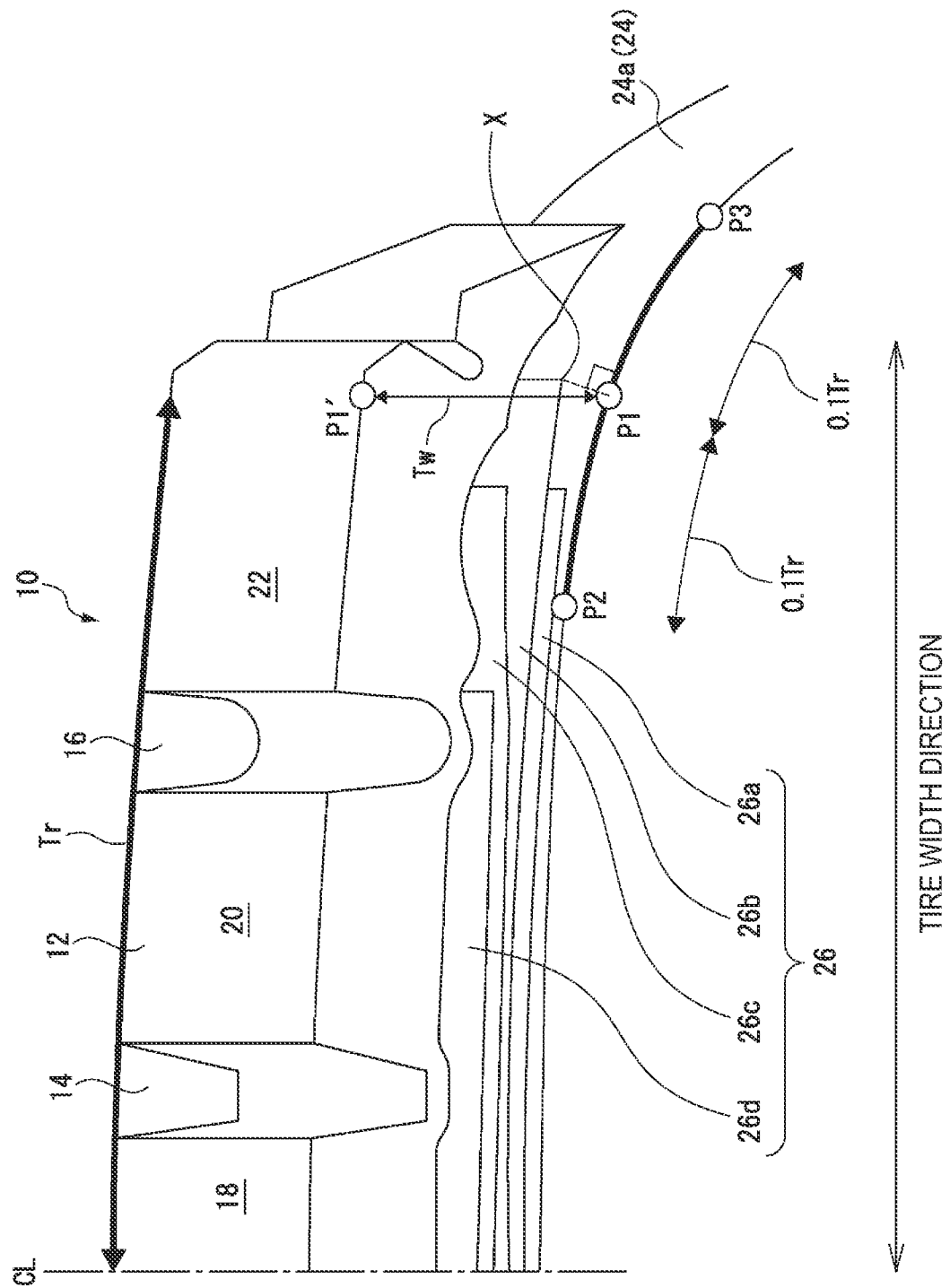
FIG. 1 is a partial cross-sectional perspective view illustrating a tire according to an embodiment of the present technology.

FIG. 1 is a partial cross-sectional perspective view illustrating a tire according to an embodiment of the present technology, more specifically, a view illustrating a tread portion 10 and the like on one side from a tire equatorial plane CL as a boundary in the tire width direction. According to the embodiment of the present technology, a tread portion on an opposite side from the tire equatorial plane CL in the tire width direction, which is not illustrated in FIG. 1, may have a mirror-symmetrical relationship with the tread portion illustrated in FIG. 1 (constituents that can be determined from FIG. 1 are considered, and a carcass cord angle and a belt cord angle are not considered), but these tread portions do not need to have a mirror-symmetrical relationship with each other.

In the present specification, a regular rim refers to an "applicable rim" specified by JATMA (The Japan Automobile Tyre Manufacturers Association, Inc.), a "Design Rim" specified by TRA (The Tire and Rim Association, Inc.), or a "Measuring Rim" specified by ETRTO (The European Tyre and Rim Technical Organisation). Additionally, a regular internal pressure refers to a "maximum air pressure" specified by JATMA, a maximum value in "TIRE LOAD LIMITS AT VARIOUS COLD INFLATION PRESSURES" specified by TRA, or "INFLATION PRESSURES" specified by ETRTO.

The tread portion 10 of the tire illustrated in FIG. 1 is made of a rubber material (tread rubber) and is exposed on the outermost side of the tire in the tire radial direction, with the surface thereof constituting the contour of the tire. The surface of the tread portion 10 is formed as a tread surface 12, which is a surface that comes into contact with a road surface during traveling of a vehicle (not illustrated) with the tire mounted. In the example illustrated in FIG. 1, three land portions 18, 20, and 22 are partitioned by two circumferential main grooves 14 and 16 on one side from the tire equatorial plane CL.

The tire illustrated in FIG. 1 forms a carcass 24 made of at least one carcass layer 24a and a belt 26 that is disposed on the outer side of the carcass 24 in the tire radial direction and made of four belt layers 26a, 26b, 26c, and 26d. Note that FIG. 1 illustrates no cords for either the carcass 24 or the belt 26.

Among the four belt layers 26a to 26d, the belt layer 26b that is the second belt layer from the inner side in the tire radial direction includes a cord extending from the inner side toward the outer side in the tire width direction on one side in the tire circumferential direction. The belt layer 26c that is the third belt layer from the inner side in the tire radial direction includes a cord extending from the inner side toward the outer side in the tire width direction on the other side in the tire circumferential direction. That is, the extension direction of the cord of the belt layer 26b and the extension direction of the cord of the belt layer 26c cross with each other in a tire see-through plan view. Hereinafter, two belt layers that have a relationship in cord extension directions, such as the relationship between the belt layer 26b and the belt layer 26c, and are adjacent to each other in the tire radial direction may each be referred to as a "cross belt layer".

Here, the inclination angles of the cords of the belt layer 26b and the belt layer 26c with respect to the tire circumferential direction can each be 10° or more and 45° or less. These inclination angles may each be an angle on one side or an angle on the other side in the tire width direction with respect to the tire circumferential direction in the tire see-through plan view. The inclination angle of a belt cord is determined as follows. First, an image of an extension state of the cord is taken by a tire X-ray device or the like, and a specific region of the cord is divided into a plurality of small regions. The dimensions of the small regions divided in the tire width direction are each 0.01 mm or more and 10 mm or less. Next, an angle is calculated from coordinates of both end points in the tire width direction in each small region and defined as the inclination angle in the small region. Finally, the inclination angles calculated for the respective small regions are averaged in consideration of the number of the small regions to determine the inclination angle of the belt cord in the specific region.

On the other hand, among the four belt layers 26a to 26d, the belt layer 26a and the belt layer 26d that are respectively the first and the fourth belt layers from the inner side in the tire radial direction include a cord that may extend from the inner side toward the outer side in the tire width direction either on one side or the other side in the tire circumferential direction.

Here, it is important that the inclination angle of the cord of the belt layer 26a with respect to the tire circumferential direction is set to an inclination angle that reduces both of the tire internal structure strain caused by a carcass cord present on the inner side of the belt layer 26a in the tire radial direction and the tire internal structure strain caused by the cross belts 26b and 26c present on the outer side of the belt layer 26a. From this point of view, the inclination angle of the cord of the belt layer 26a with respect to the tire circumferential direction can be configured to extend on the same side as the adjacent belt layer 26b in the tire width direction with respect to the tire circumferential direction and to be about 60° with respect to the tire circumferential direction.

On the other hand, it is important that the inclination angle of the cord of the belt layer 26d with respect to the tire circumferential direction is set to an inclination angle that cause no shear strain between the cross belts 26b and 26c present on the inner side of the belt layer 26d in the tire radial direction. From this point of view, the inclination angle of the cord of the belt layer 26d with respect to the tire circumferential direction can be extended on the same side as the adjacent belt layer 26c in the tire width direction with respect to the tire circumferential direction and be about 20° with respect to the tire circumferential direction.

Next, in FIG. 1, when the inclination angle of the cord included in the belt layer 26c with respect to the tire width direction is defined as a positive inclination angle, a perpendicular line is drawn from an end portion X in the tire width direction of the belt layer 26b having the maximum belt width (dimension in the tire width direction) to the carcass, and an intersection point between the perpendicular line and the carcass 24 (specifically, a cord included in the outermost carcass layer 24a in the tire radial direction) is defined as a first reference point P1.

Under the assumption described above, in the tire according to the embodiment of the present technology, the inclination angle of the cord at the first reference point P1 with respect to the tire width direction (hereinafter may be referred to as an inclination angle 1 (°)) is −3° or more in the tire see-through plan view.

Here, the inclination angle 1 in the see-through plan view is actually determined by taking an image of an extension state of the carcass cord by a tire X-ray device or the like and calculating an angle from coordinates of both ends of a region including the reference point P1 in the image. The dimension of the region in the tire width direction is 0.01 mm or more 10 mm or less.

Effects

In a case where a belt including at least cross belt layers (two belt layers adjacent to each other in the tire radial direction in which belt cords cross each other in a tire see-through plan view) is formed on the outer side of a carcass in the tire radial direction, a carcass cord with the extension direction changed during manufacturing of the tire is deformed in the tire circumferential direction due to a tension applied during the inflation, a shear strain is generated, and thus, the shear strain propagates to a tread. For a belt cord, a shear strain is generated at the end portions of crossed belts during the inflation, and the shear strain propagates to the tread.

As described above, the carcass cord or the belt cord are deformed during manufacturing or inflation of the tire, a strain is generated in the internal structure of the tire, and consequently the strain propagates to the tread. However, the embodiment of the present technology reduces the strain propagating to the tread by adding an improvement to the extension direction of the carcass cord.

According to the embodiment of the present technology, in FIG. 1, to efficiently affect an end portion X in the tire width direction of the belt layer 26b having the maximum belt width in which a shear strain is most likely to be generated, the extension direction of the carcass cord, which is closest to the end portion X, is improved at a point P1 to reduce a strain of the tread. Specifically, in the tire see-through plan view, based on the inclination angle of the cord of the cross belt layer 26c located on the outer side in the tire radial direction with respect to the tire width direction, the extension direction of the carcass cord with respect to the tire width direction at the point P1 is set on the same side in the tire circumferential direction with respect to the tire width direction or set on a different side at the inclination angle 1 with a slight difference of 3. Such a configuration allows for reducing the occurrence of slippage in the ground contact surface due to the strain on the tread surface propagated from the tire internal structure strain and reducing the occurrence of local uneven wear when the tire contacts the ground and rotates. Accordingly, the above configuration corrects the tire internal structure strain, consequently suppresses the strain of the tread, and thus enables uneven w ear resistance performance to be improved.

Figure 2A:
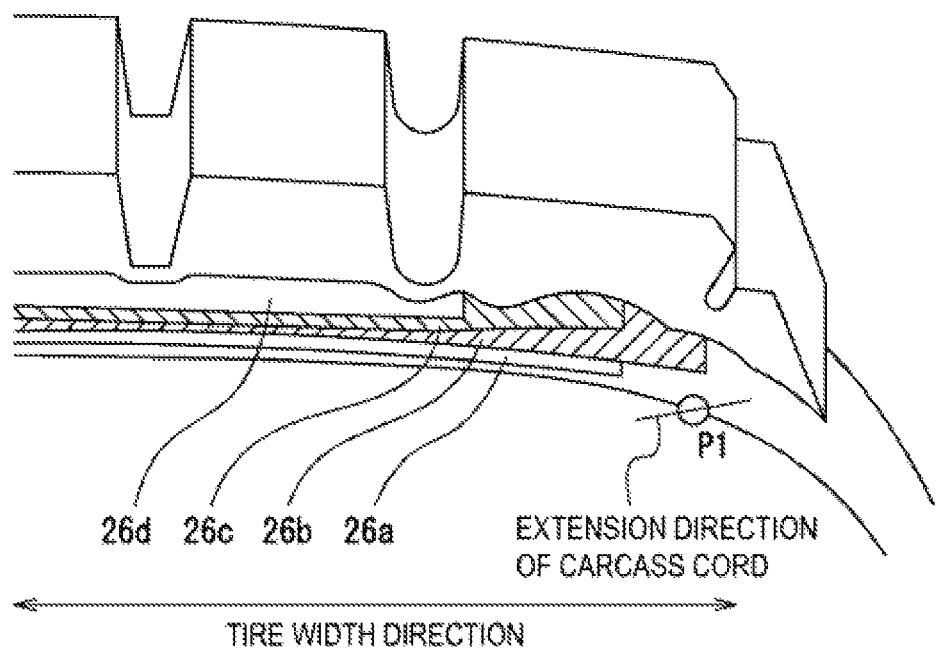
FIGS. 2A-2B are partial cross-sectional perspective views illustrating an extension direction of a carcass cord at the point P1 in FIG. 1.
Figure 2B:
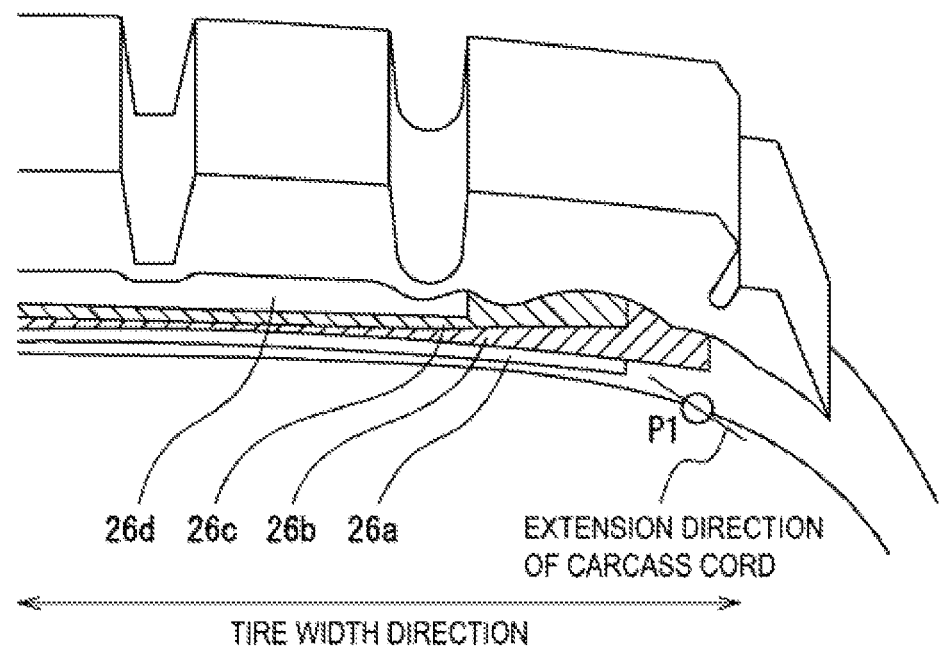

FIG. 2 is a partial cross-sectional perspective view illustrating the extension direction of the carcass cord at the point P1 in FIG. 1. FIG. 2(a) illustrates a case where the inclination angle of the carcass cord at the point P1 is a negative angle when the inclination angle of the cord included in the belt layer 26c with respect to the tire width direction is a positive angle. FIG. 2(b) illustrates a case where the inclination angle of the carcass cord at the point P1 is a positive angle when the inclination angle of the cord included in the belt layer 26c with respect to the tire width direction is a positive angle.

According to the embodiment of the present technology, as described above, the inclination angle 1 of the cord of the outermost carcass layer in the tire radial direction that is closest to the belt layer having the maximum belt width in which a shear strain is most likely to be generated at the point P1 with respect to the tire width direction is set to −3° or more. Here, as illustrated in FIG. 2(a), the inclination angle 1 being a negative angle means that the extension direction of the cord of the carcass layer 24a is in an opposite direction to the extension direction of the cord of the cross belt 26c with respect to the tire circumferential direction (type 1).

On the other hand, as illustrated in FIG. 2(b), the inclination angle 1 being a positive angle means that the extension direction of the cord of the carcass layer 24a is in the same direction as the extension direction of the cord of the cross belt 26c with respect to the tire circumferential direction (type 2).

Both of the types 1 and 2 produce an effect (improvement of the uneven wear resistance performance) in contrast to the known technique as described above.

The upper limit value of the inclination angle 1 of the cord with respect to the tire width direction at the first reference point P1 can be set to 30°. The inclination angle of the carcass significantly affects tire durability. A positive inclination angle is advantageous for reducing the deformation of a tread edge. However, an inclination angle exceeding 300 may induce separation of the carcass, and thus the upper limit is set to 30°.

It is preferable to set the inclination angle 1 to 0° or more because each of the above effects is achieved at a higher level, and it is extremely preferable to set the inclination angle 1 to more than 0° because each of the above effects is achieved at an extremely high level.

Figure 3A:
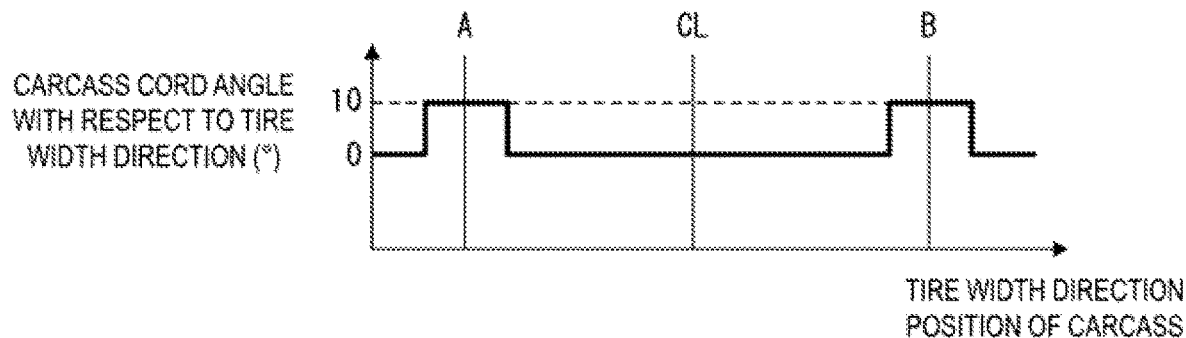
FIGS. 3A-3B are diagrams illustrating a relationship between a carcass cord angle with respect to a tire width direction and a position of a carcass in the tire width direction.
Figure 3B:
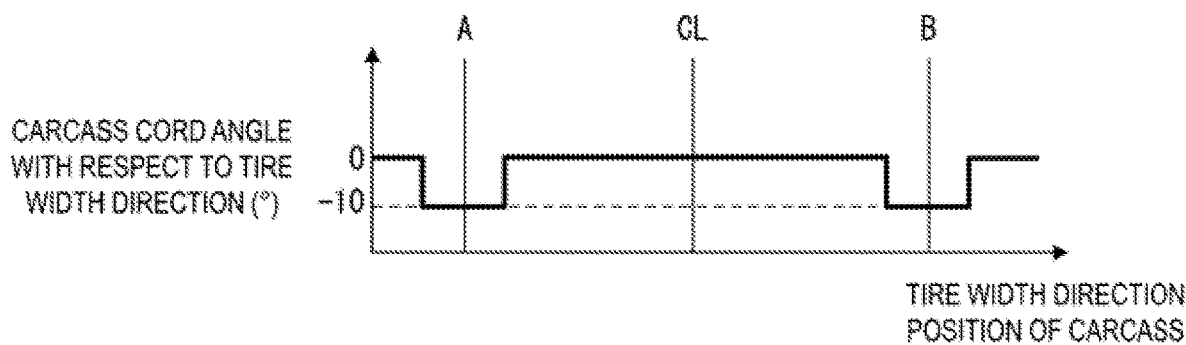

FIG. 3 is a diagram illustrating a relationship between a carcass cord angle (°) with respect to the tire width direction and a position of a carcass in the tire width direction. More specifically, FIG. 3(a) illustrates an example according to the embodiment of the present technology, and FIG. 3(b) illustrates a conventional example. In FIG. 3, each of points A and B is present on either side with reference to the tire equatorial plane CL and is a point corresponding to the point P1 illustrated in FIG. 1.

As illustrated in FIG. 3(a), when the inclination angle 1 is −3° or more and 100 or less at the positions of the points A and B in the tire width direction, the above effects are achieved. On the other hand, as illustrated in FIG. 3(b), when the inclination angle 1 is not −3° or more and 100 or less at the positions of the points A and B in the tire width direction, the above effects are not achieved.

Figure 4A:
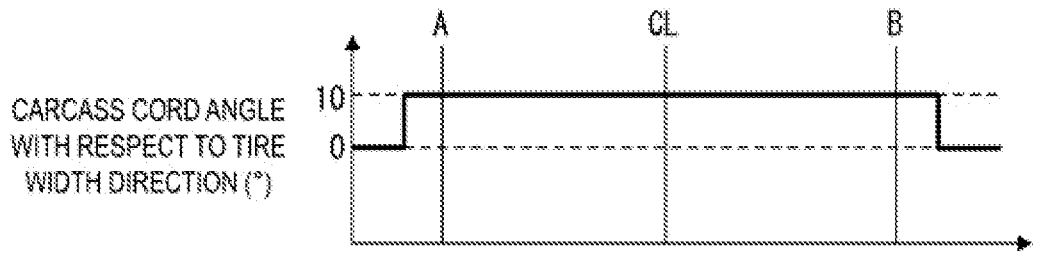
FIGS. 4A-4D are diagrams illustrating variations in a relationship between a carcass cord angle with respect to a tire width direction and a position of a carcass in the tire width direction according to an embodiment of the present technology.
Figure 4B:
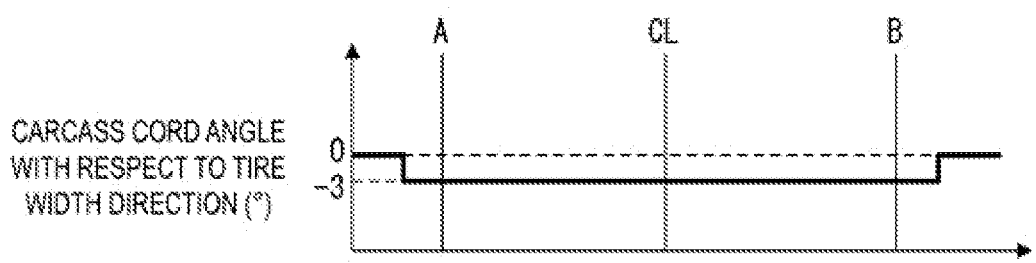

FIG. 4 is a diagram illustrating variations in a relationship between a carcass cord angle and a position of a carcass in the tire width direction according to the embodiment of the present technology, and FIGS. 4(a) to 4(d) are examples thereof. The carcass cord angle can be a positive angle at both of the points A and B as illustrated in FIG. 4(a) and can also be a negative angle at both of the points A and B as illustrated in FIG. 4(b).

Figure 4C:
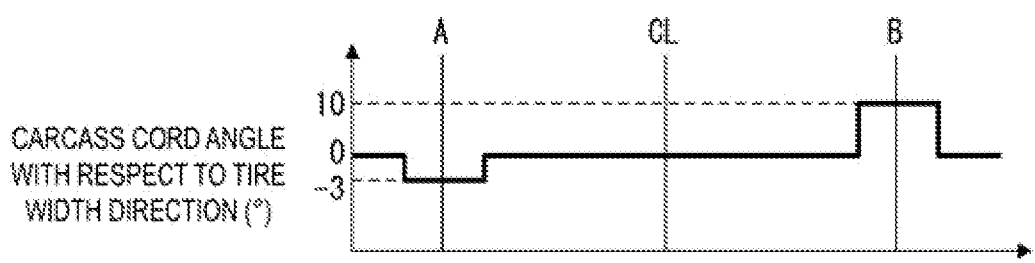
Figure 4D:
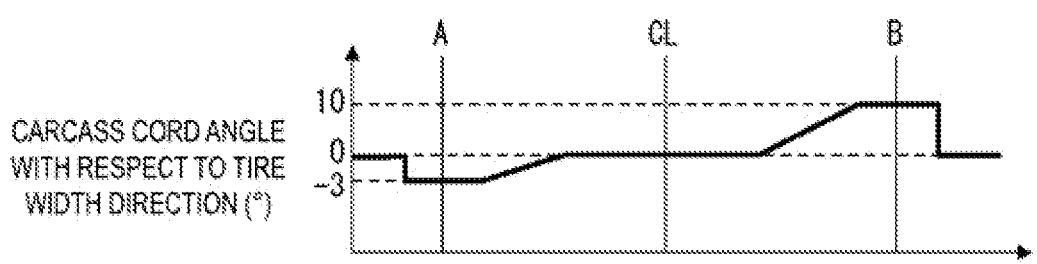

Further, the carcass cord angle can be a negative angle at the point A and a positive angle at the point B and vice versa as illustrated in FIG. 4(c) and can also be an angle continuously varying in accordance with variations in the position of a carcass in the tire width direction as illustrated in FIG. 4(d).

Note that, in a case where the carcass cord angle continuously varies as illustrated in FIG. 4(d), there is a low possibility that the entire tire twists to cause a strain during the inflation, and thus it is possible to reduce at a high level the occurrence of cracks due to a strain generated between a sidewall portion and a tread portion. Further, in a case where the carcass cord angle continuously varies as illustrated in FIG. 4(d), a local strain can be eliminated in a carcass layer during the inflation as compared with a case where the carcass cord discontinuously varies.

The tire according to the embodiment of the present technology described above has a meridian cross-sectional shape similar to a conventional tire, in spite of not being entirely illustrated. In other words, the tire according to the embodiment of the present technology includes a bead portion, a sidewall portion, a shoulder portion, and a tread portion from the inner side to the outer side in the tire radial direction in a tire meridian cross-sectional view. As partially illustrated in FIG. 1, for example, in a tire meridian cross-sectional view, the tire includes a carcass layer that extends from the tread portion to the bead portions on both sides and is wound around a pair of bead cores, and the above-described belt layer and, in some cases, a belt cover layer (not illustrated in FIG. 1) on the outer side of the carcass layer in the tire radial direction.

In addition, the tire according to the embodiment of the present technology described above is obtained through ordinary manufacturing steps, such as a tire material mixing step, a tire material processing step, a green tire molding step, a vulcanization step, and an inspection step after the vulcanization. In manufacturing the tire according to the embodiment of the present technology, for example, a recess portion and a protrusion portion corresponding to the tread pattern partially illustrated in FIG. 1 are formed in the inner wall of a vulcanization mold, and vulcanization is performed by using this mold.

ADDITIONAL EMBODIMENTS

Next, Additional Embodiments 1 to 11 that can optionally be implemented on the above-described Basic Embodiment of the tire according to the present technology will be described.

Additional Embodiment 1

In Basic Embodiment, in the tire see-through plan view, the absolute value of the inclination angle of the cord of the carcass layer 24a at the first reference point P1 illustrated in FIG. 1 with respect to the tire width direction is preferably equal to or less than the average value of the absolute value of the inclination angle of the cord of the first belt layer 26b with respect to the tire circumferential direction and the absolute value of the inclination angle of the cord of the second belt layer 26c with respect to the tire circumferential direction (Additional Embodiment 1). The present embodiment is based on a finding that separation of a carcass may be induced when the predetermined range described above is not satisfied. For the above-described inclination angles of the cord of the first belt layer 26b and the cord of the second belt layer 26c, one side in the tire width direction with respect to the tire circumferential direction is a positive direction and the other side is a negative direction. An inclination angle of a carcass cord at a certain point (for example, the first reference point P1 in the present embodiment) is determined by taking an image of the extension state of the cord by a tire X-ray device or the like and measuring an inclination angle at that point.

During inflation, a stress is applied to the carcass cord in a manner such that the extension direction thereof comes close to the tire width direction, while a stress is applied to a cross belt cord in a manner such that the extension direction thereof comes close to the tire circumferential direction. On the assumption of such a behavior of each cord during the inflation described above, in the tire according to the present embodiment, the above-described configuration allows shear deformation of a tread portion due to deformation of belt end portions to be offset by deformation of a carcass, and consequently the uneven wear resistance performance can be further improved.

Additional Embodiment 2

In FIG. 1, a dimension along a tire profile from the tire equatorial plane CL to a tread surface position P1', which is identical to the position of the first reference point P1 in the tire width direction, is defined as Tr, a point located 0.1 Tr inner side in the tire width direction from the first reference point P1 along the profile of the carcass 24 is defined as a second reference point P2, and a point located 0.1 Tr outer side in the tire width direction from the first reference point 1 along the profile of the carcasses 24 is defined as a third reference point P3.

In Basic Embodiment or an embodiment obtained by adding Additional Embodiment 1 to Basic Embodiment, in the tire see-through plan view, regarding the outermost carcass layer 24a in the tire radial direction illustrated in FIG. 1, the inclination angle of a cord with respect to the tire width direction at least in a region in the tire width direction from the second reference point P2 to the third reference point P3 (hereinafter may be referred to as an "inclination angle 2 (°)") is preferably −3° or more and 100 or less (Additional Embodiment 2).

Additional Embodiment 2 is an embodiment in which the range of the extension of a carcass cord at a specific angle is expanded as compared with Basic Embodiment and the inclination angle 2 is set to −3° or more and 10° or less not only at the first reference point P1 but also at least in the region in the tire width direction from the second reference point P2 to the third reference point P3 in FIG. 1.

By setting the inclination angle 2 to −3° or more and 100 or less, it is possible to ensure a wider region in which the carcass cord extending at a predetermined angle range with respect to the tire width direction are present. Accordingly, the region in which the above effect can be achieved is expanded, making it possible to further improve the uneven wear resistance performance in the vicinity of a ground contact edge during traveling of a vehicle in which the tire is mounted on a regular rim and inflated to the regular internal pressure.

It is preferable to set the inclination angle 2 to 0° or more because the above effect is achieved at a higher level, and it is extremely preferable to set the inclination angle 2 to more than 0° because the above effect is achieved at an extremely high level.

Additional Embodiment 3

Figure 5:
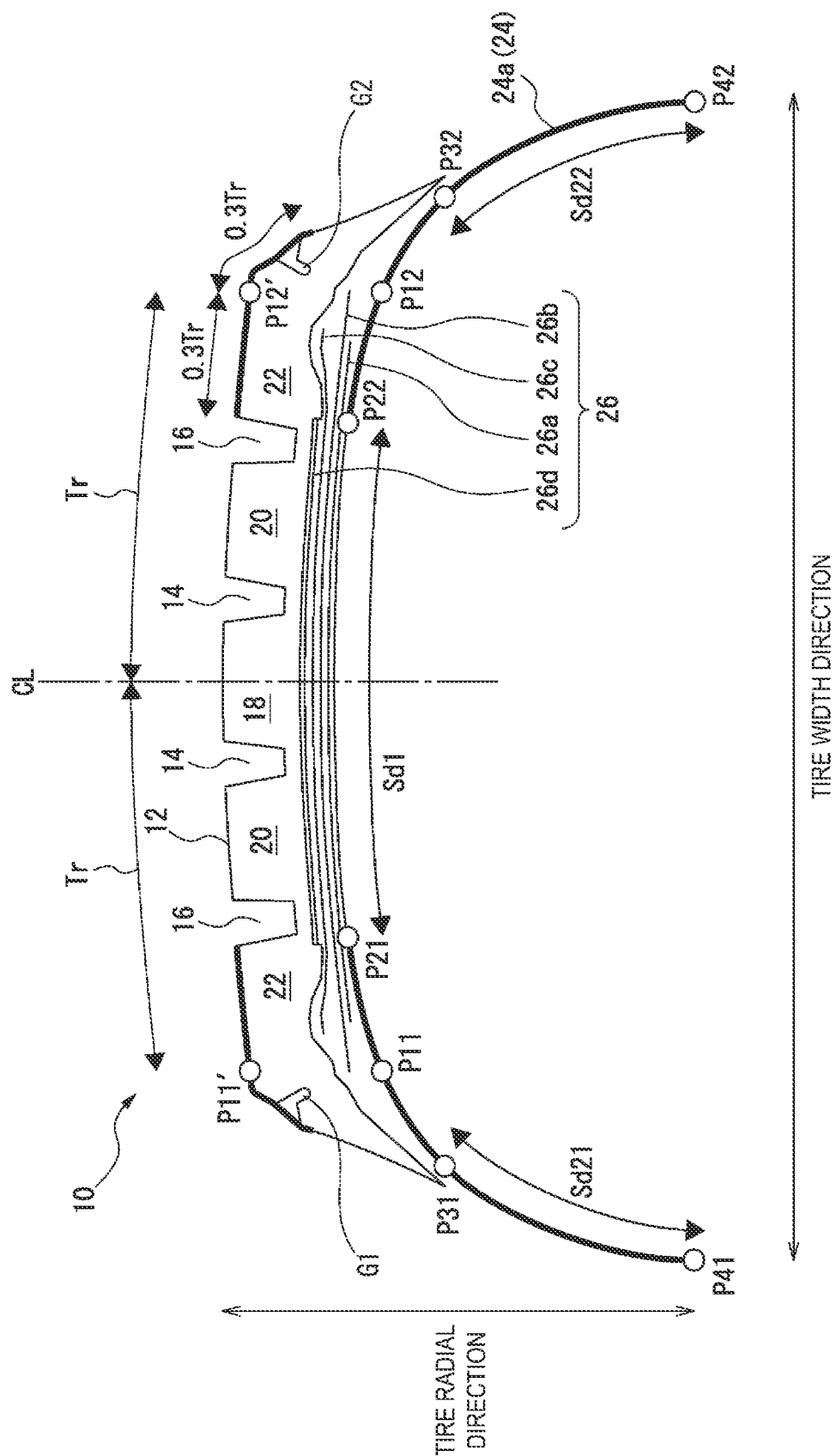
FIG. 5 is a tire meridian cross-sectional view illustrating a tire according to an embodiment of the present technology.

FIG. 5 is a tire meridian cross-sectional view illustrating a tire according to an embodiment of the present technology. In FIG. 5, the reference signs 10 to 26, CL, and Tr indicate the same constituent members as those illustrated in FIG. 1. In addition, in FIG. 5, the reference signs P11 (P12), P11' (P12'), P21 (P22), P31 (P32), P41 (P42) correspond to P1, P1', P2, P3, and P4 illustrated in FIG. 1, respectively.

As illustrated in FIG. 5, a dimension along a tire profile from the tire equatorial plane CL to a tread surface position P11' (P12') that is identical to the position of the first reference point P11 (P12) in the tire width direction is defined as Tr, and points located 0.1 Tr inner side in the tire width direction from the first reference points P11 and P12 along the profile of the carcass are defined as second reference points P21 and P22.

In Basic Embodiment or an embodiment obtained by adding at least either of Additional Embodiment 1 or 2 to Basic Embodiment, in the tire see-through plan view, regarding the outermost carcass layer 24a in the tire radial direction, the inclination angle of the cord with respect to the tire width direction in a region in the tire width direction between the second reference point P21 on one side and the second reference point P22 on the other side from the tire equatorial plane CL as a boundary in the tire width direction (hereinafter may be referred to as an inclination angle 3 (°)) is preferably −3° or more and 30 or less relative to the respective average values of the inclination angles of the cord at the positions of the two second reference points P21 and P22 in the tire width direction with respect to the tire width direction (Additional Embodiment 3).

Additional Embodiment 3 defines the inclination angle range of the carcass cord in a specific range Sd1 in the tire width direction relative to the respective average values of the inclination angles of the carcass cord at the two second reference points P21 and P22. By setting the inclination angle 3 to −3° or more and 3° or less, variations in the inclination angle of the carcass cord in the region Sd1 in the tire width direction can be suppressed. Consequently, it is possible to further reduce the tire internal structure strain and further improve the uneven wear resistance performance in the vicinity of a ground contact edge during traveling of a vehicle in which the tire is inflated to the specified internal pressure.

It is preferable to set the inclination angle 3 to −2° or more and 2° or less because the above effect is achieved at a higher level, and it is extremely preferable to set the inclination angle 3 to −1° or more and 1° or less because the above effect is achieved at an extremely high level.

Additional Embodiment 4

As illustrated in FIG. 5, a dimension along a tire profile from the tire equatorial plane CL to the tread surface position P11' (P12') that is identical to the position of the first reference point P11 (P12) in the tire width direction is defined as Tr, and points located 0.1 Tr outer side in the tire width direction from the first reference points P11 and P12 along the profile of the carcass layer 24a are defined as third reference points P31 and P32, and the maximum width positions of the outermost carcass layer 24a in the tire radial direction are defined as fourth reference points P41 and P42.

In Basic Embodiment or an embodiment obtained by adding at least any one of Additional Embodiment 1 to 3 to Basic Embodiment, as illustrated in FIG. 5, regarding of the outermost carcass layer 24a in the tire radial direction, the inclination angle of a cord with respect to the tire width direction in a region Sd21 (Sd22) in the tire width direction from the third reference point P31 (P32) to the fourth reference point P41 (P42) on each side from the tire equatorial plane CL as a boundary relative to the inclination angle of the cord at the position of the third reference point P31 (P32) in the tire width direction on each side from the tire equatorial plane CL as a boundary with respect to the tire width direction (hereinafter may be referred to as an "inclination angle 4 (°)") is preferably −3° or more and 3° or less (Additional Embodiment 4).

Additional Embodiment 4 defines the inclination angle range of the carcass cord in a specific ranges Sd21 and Sd22 in the tire width direction relative to the respective inclination angles of the carcass cord at the two third reference points P31 and P32. By setting the inclination angle 4 to −3° or more and 3° or less, variations in the inclination angle of the carcass cord in the regions Sd21 and Sd22 in the tire width direction can be suppressed. Consequently, it is possible to further reduce the tire internal structure strain and further improve the uneven wear resistance performance in the vicinity of a ground contact edge during traveling of a vehicle in which the tire is inflated to the specified internal pressure.

It is preferable to set the inclination angle 4 to −2° or more and 2° or less because the above effect is achieved at a higher level, and it is extremely preferable to set the inclination angle 4 to −1° or more and 1° or less because the above effect is achieved at an extremely high level.

Further, in Additional Embodiment 4, by improving the extension direction of the carcass cord in the regions Sd21 and Sd22 in the tire width direction, it is possible to suppress deformation especially in shoulder portions during traveling of a vehicle and reduce the occurrence of cracks in the tire surface in the shoulder portions and the separation of the carcass in the shoulder portions.

Furthermore, in Basic Embodiment 4, regarding the outermost carcass layer 24a in the tire radial direction, the inclination angle of a cord with respect to the tire width direction in the region Sd21 (Sd22) in the tire width direction from the third reference point P31 (P32) to the fourth reference point P41 (P42) on each side from the tire equatorial plane CL as a boundary is more preferably −3° or more and 3° or less relative to the average value of the inclination angles of the cord at the positions in the tire width direction from the second reference point P21 (P22) to the third reference point P31 (P32) with respect to the tire width direction. With this configuration, it is possible to further reduce the tire internal structure strain in a wider range from the second reference point to the fourth reference point and further improve the uneven wear resistance performance in the vicinity of a ground contact edge during traveling of a vehicle in which the tire is inflated to the specified internal pressure.

The average value of the inclination angles of the cord at the positions in the tire width direction from the second reference point P21 (P22) to the third reference point P31 (P32) with respect to the tire width direction is determined as follows. First, an image of the extension state of the carcass cord is taken by a tire X-ray device or the like, and a region between the reference points of the carcass cord is divided into a plurality of small regions. The dimension in the tire width direction of each of the small regions divided is 0.01 mm or more and 10 mm or less. Next, an angle calculated based on the coordinates of both end points of each small region in the tire width direction is defined as an inclination angle in that small region. Finally, the inclination angles calculated for the respective small regions are averaged in consideration of the number of the small regions to determine the inclination angle of the carcass cord in between the reference points. As described above for the present embodiment, the inclination angle of the carcass cord in a region having a certain range is determined. In the present embodiment, the region from the second reference point P21 (P22) to the third reference point P31 (P32) is an inclination angle calculation target region, but also in a case where the region from the third reference point P31 (P32) to the fourth reference point P41 (P42) is an inclination angle calculation target region, the same method of determining inclination angles is adopted.

Additional Embodiment 5

As illustrated in FIG. 5, a dimension along a tire profile from the tire equatorial plane CL to the tread surface position P11' (P12') that is identical to the position of the first reference point P11 (P12) in the tire width direction is defined as Tr, a point located 0.1 Tr inner side in the tire width direction from the first reference points P11 (P12) along the profile of the carcass layer 24a is defined as a second reference point P21 (P22), a point located 0.1 Tr outer side in the tire width direction from the first reference point P11 (P12) along the profile of the carcass layer 24a is defined as the third reference point P31 (P32), and the maximum width position of the outermost carcass layer 24a in the tire radial direction is the fourth reference point P41 (P42).

In Basic Embodiment or an embodiment obtained by adding at least any one of Additional Embodiments 1 to 4 to Basic Embodiment, in the tire see-through plan view, regarding the outermost carcass layer 24a in the tire radial direction as illustrated in FIG. 5, the average value of the inclination angles of the cord with respect to the tire width direction in the region Sd1 in the tire width direction between the second reference point P21 on one side and the second reference point P22 on the other side from the tire equatorial plane CL as a boundary in the width direction relative to the average value of the inclination angles of the cord with respect to the tire width direction in the region Sd21 (Sd22) in the tire width direction from the third reference point P31 (P32) to the fourth reference point P41 (P42) (hereinafter may be referred to as an "inclination angle 5 (°)") is preferably −10° or more and 10° or less on each side from the tire equatorial plane C L as a boundary in the tire width direction (Additional Embodiment 5).

By setting the inclination angle 5 to −10° or more and 10° or less, it is possible to further reduce the tire internal structure strain between both sidewall portions and further improve the uneven wear resistance performance in the vicinity of a ground contact edge during traveling of a vehicle in which the tire is inflated to the specified internal pressure. Accordingly, without excessively increasing variations in the cord angle of the carcass layer 24a especially between the tread portion and the sidewall portions during traveling of a vehicle, it is possible to suppress the deformation of each shoulder portion that is a joint between the tread portion and the sidewall portion and prevent the occurrence of cracks in the tire surface in the shoulder portions and the separation of the carcass in the shoulder portions.

It is preferable to set the inclination angle 5 to −9° or more and 9° or less because the above effect is achieved at a higher level and it is extremely preferable to set the inclination angle 5 to −8° or more and 8° or less because the above effect is achieved at an extremely high level.

Additional Embodiment 6

In Basic Embodiment or an embodiment obtained by adding at least any one of Additional Embodiments 1 to 5 to Basic Embodiment, as illustrated in FIG. 1, a dimension Tw from the first reference point P1 to the tread surface (the point P1') along the tire radial direction is preferably 50 mm or less (Additional Embodiment 6).

During inflation, the extension direction of a carcass cord comes close to the tire width direction by a stress applied to the carcass layer 24a, whereas the extension direction of a cross belt cord comes close to the tire circumferential direction by a stress applied to the cross belt layers 26b and 26c, and the variations in the cord extension direction each propagate to the tread as strains. According to Additional Embodiment 6, to offset the effects of the tire internal structure strain due to the carcass cord and the tire internal structure strain due to the cross belt cord to the tread during inflation, the effect of the strain due to the carcass cord that is farther from the tread is efficiently propagated to the tread, reducing the strain in the tread and thus further improving the uneven wear resistance performance.

It is preferable to set the dimension Tw to 47 mm or less because the above effect is achieved at a higher level, and it is extremely preferable to set the dimension Tw to 44 mm or less because the above effect is achieved at an extremely high level.

Additional Embodiment 7

In Basic Embodiment or an embodiment obtained by adding at least any one of Additional Embodiments 1 to 6 to Basic Embodiment, as illustrated in FIG. 5, it is preferable that a groove G1 (G2) is formed in a region in the tire width direction from a position 0.3 Tr inner side in the tire width direction from the tread surface position P11' (P12') along the tire profile to a position 0.3 Tr outer side in the tire width direction from the tread surface position P11' (P12') along the tire profile (Additional Embodiment 7).

By forming the groove G1 (G2) in the region in the tire width direction from the position 0.3 Tr inner side in the tire width direction from the tread surface position P11' (P12') along the tire profile to the position 0.3 Tr outer side in the tire width direction from the tread surface position P11' (P12') along the tire profile, it is possible to relieve a stress applied to the tread surface position P1' (P12') where uneven wear is likely occur during traveling of a vehicle. Consequently, it is possible to even further improve the uneven wear resistance performance in the vicinity of a ground contact edge during traveling of a vehicle in which the tire is inflated to the specified internal pressure.

It is further preferable that a groove is formed in a region in the tire width direction from a position 0.25 Tr inner side in the tire width direction from the tread surface position P11' (P12') along the tire profile to a position 0.25 Tr outer side in the tire width direction from the tread surface position P11' (P12') along the tire profile, because the above effect is achieved at a higher level.

Additional Embodiment 8

Figure 6:
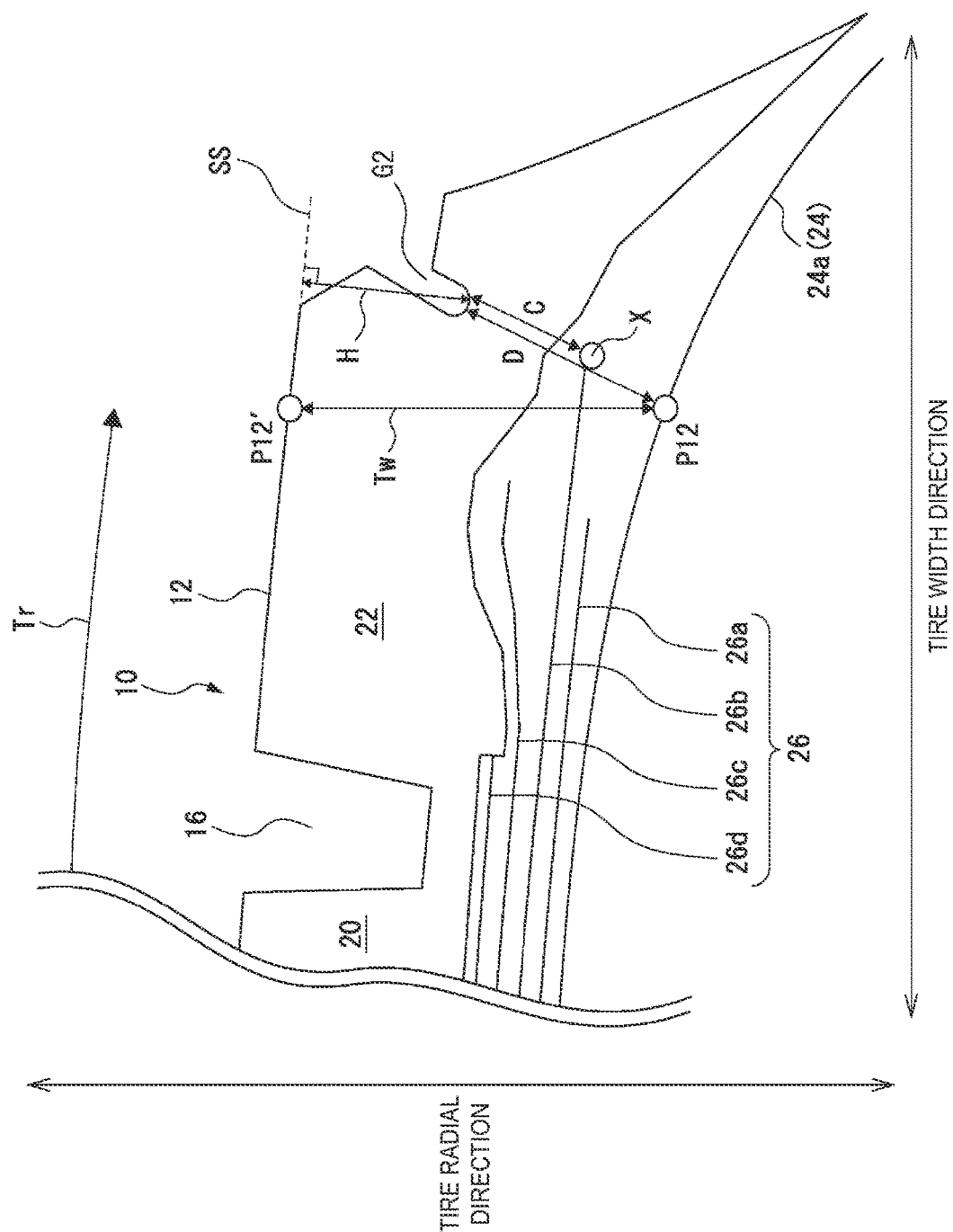
FIG. 6 is a tire meridian cross-sectional view illustrating an enlarged region from a tread portion to a shoulder portion of the tire illustrated in FIG. 5.

FIG. 6 is a tire meridian cross-sectional view illustrating an enlargement of a region from the tread portion to the shoulder portion of the tire illustrated in FIG. 5. In the example illustrated in FIG. 6, a narrow groove G2 extending in the tire circumferential direction is formed so as to have an opening end on the outer side of the tread surface position P12' in the tire width direction.

As illustrated in FIG. 6, a dimension from the tire equatorial plane (not illustrated) to the tread surface position P12' along the tire profile is defined as Tr. A line obtained by extending the tire profile on the inner side of the tread surface position P12' in the tire width direction to the outer side in the tire width direction is defined as a tread surface position extension line SS (including dotted line illustrated in FIG. 6), and a dimension of a perpendicular line from the groove bottom of the narrow groove G2 (the innermost position of a groove profile in the tire radial direction) to the tread surface position extension line SS is defined as H. A dimension from the groove bottom of the narrow groove G2 to the end portion X in the tire width direction of the cross belt layer 26b having the largest width is defined as C, and a dimension from the groove bottom of the narrow groove G2 to the first reference point P1 is defined as D.

In Basic Embodiment or an embodiment obtained by adding at least any one of Additional Embodiments 1 to 7 to Basic Embodiment, it is preferable that the reference signs H. C, and D illustrated in FIG. 6 satisfy the relationships of 1.0≤H/C≤2.0 and 0.5≤H/D≤1.5, and further a dimension along the profile of the belt layer 26b having a wider width among the first belt layer 26b and the second belt layer 26c is 0.80 Tr or more and 1.20 Tr or less (Additional Embodiment 8).

By setting a ratio H/C to 1.0 or more and/or a ratio H/D to 0.5 or more, it is possible to ensure a sufficient depth of the groove G2 and increase the deformability of the land portion 22 including the tread surface position P12'. Consequently, it is possible to relieve the stress applied to the tread surface position P12' and the vicinity thereof where uneven wear is likely to occur during traveling of a vehicle at a higher level and even further improve the uneven wear resistance performance in the vicinity of a ground contact edge during traveling of a vehicle in which the tire is inflated to the specified internal pressure. Meanwhile, in the embodiments of the present technology, the dimension in the tire width direction from the tread surface position P12' to an opening end of the narrow groove G2 on an inner side in the tire width direction is 20 mm or less.

On the other hand, by setting the ratio H/C to 2.0 or less and/or the ratio H/D to 1.5 or less, it is possible to prevent the tire internal structure strain that cannot be completely eliminated by the improvement of the extension direction of the cord of the carcass layer 24a and the extension direction of the cord of the belt 26 from easily reaching the groove bottom of the narrow groove G2. This makes it possible to prevent the concentration of strain in the groove bottom of the narrow groove G2 and consequently reduce the generation of cracks in the groove bottom.

It is preferable to set the ratio H/C to 1.1 or more and 1.9 or less because each of the above effects is achieved at a high level, and it is extremely preferable to set the ratio H/C to 1.2 or more and 1.8 or less because each of the above effects is achieved at an extremely high level. Similarly, it is preferable to set the ratio H/D to 0.6 or more and 1.4 or less because each of the above effects is achieved at a high level, and it is extremely preferable to set the ratio H/D to 0.7 or more and 1.3 or less because each of the above effects is achieved at an extremely high level.

Next, by setting the dimension along the profile of the belt layer 26b having a wider width among the first belt layer 26b and the second belt layer 26c to 0.80 Tr or more, it is possible to increase the rigidity in the vicinity of the groove bottom and further reduce the generation of cracks in the groove bottom of the narrow groove G2.

On the other hand, by setting the above dimension to 1.20 Tr or less, it is possible to increase the rigidity in the vicinity of the groove bottom and improve rolling resistance performance and fuel economy performance without excessively increasing the tire width direction of the belt layer 26b.

It is preferable to set the dimension along the belt layer 26b having a wider width among the first belt layer 26b and the second belt layer 26c to 0.85 Tr or more and 1.15 Tr or less because each of the above effects is achieved at a high level, and it is extremely preferable to set the dimension to 0.90 Tr or more and 1.10 Tr or less because each of the above effects is achieved at an extremely high level.

Additional Embodiment 9

In Basic Embodiment or an embodiment obtained by adding at least any one of Additional Embodiments 1 to 8 to Basic Embodiment, the elongation at break of the tread rubber constituting the tread portion illustrated in FIG. 1, 5, or 6 is preferably 300% or more (Additional Embodiment 9). Here, the elongation at break can be measured and calculated in accordance with JIS (Japanese Industrial Standard) K6251-1993 by cutting the tread rubber, which is a cured product of a predetermined composition, into a dumbbell-shaped test piece (for example, dumbbell No. 3) having a specific thickness.

By setting the elongation at break of the tread rubber to 300% or more, it is possible to further increase the deformability of the land portion 22 including the tread surface position P1'. Consequently, it is possible to relieve the stress applied to the tread surface position P1' and the vicinity thereof where uneven wear is likely to occur during traveling of a vehicle at an even higher level and even further improve the uneven wear resistance performance in the vicinity of a ground contact edge during traveling of a vehicle in which the tire is inflated to the specified internal pressure.

It is preferable to set the elongation at break of the tread rubber to 350% or more because the above effect is achieved at a high level, and it is extremely preferable to set the elongation at break to 400% or more because the above effect is achieved at an extremely high level.

Additional Embodiment 10

In Basic Embodiment or an embodiment obtained by adding at least any one of Additional Embodiments 1 to 9 to Basic Embodiment, the cord constituting the carcass layer illustrated in FIG. 1, 5, or 6 is preferably a steel cord (Additional Embodiment 10).

The final object of the embodiments of the present technology is to improve the uneven wear resistance performance in the vicinity of a ground contact edge during traveling of a vehicle in which the tire is inflated to the specified internal pressure, and Additional Embodiment 10 is also premised on Basic Embodiment and the like. To efficiently achieve the above effect (achieving substantially zero tire internal structure strain in the tread by improving the extension direction of the carcass cord, more specifically, offsetting the strain due to the carcass cord and the strain due to the cross belt cord in the tread), it is important to reliably propagate the tire internal structure strain due to the carcass cord, which is farther from the tread than the belt cord is, to the tread.

Since the ease of such propagation depends on the rigidity of the carcass cord, it is preferable to use a steel cord as the carcass cord rather than organic fiber cord. Note that Additional embodiment 10 is an embodiment intended for heavy duty tires in which the steel cord is frequently used as the carcass cord.

Additional Embodiment 11

In Basic Embodiment or an embodiment obtained by adding at least any one of Additional Embodiments 1 to 10 to Basic Embodiment, the regular internal pressure of the tire illustrated in FIG. 1, 5, or 6 is preferably 500 kPa or more (Additional Embodiment 11).

The final object of the embodiments of the present technology is to improve the uneven wear resistance performance in the vicinity of a ground contact edge during traveling of a vehicle in which the tire is inflated to the specified internal pressure, and Additional Embodiment 11 is also premised on Basic Embodiment and the like. To efficiently achieve the above effect (achieving substantially zero tire internal structure strain in the tread by improving the extension direction of the carcass cord, more specifically, offsetting the strain due to the carcass cord and the strain due to the cross belt cord in the tread), it is important to reliably propagate the tire internal structure strain due to the carcass cord, which is farther from the tread than the belt cord, to the tread.

Since the ease of such propagation depends on the regular internal pressure of the tire, it is preferable to set the regular internal pressure to 500 kPa or more. Note that, similar to Additional Embodiment 10, Additional embodiment 11 is also an embodiment intended for heavy duty tires with a relatively high regular internal pressure of the tire.

Example

Tires according to Examples 1 to 11 and Conventional Example having a tire size of 295/75R22.5 (specified by JATMA) and having the shapes illustrated in FIG. 1, 5, or 6 were manufactured. Note that the detailed conditions of these tires are as shown in Tables 1 and 2 below. In Tables 1 and 2, "inclination angle 1 (°)", "inclination angle 2 (°)", "inclination angle 3 (°)", "inclination angle 4 (°)", "inclination angle 5 (°)", "ratio H/C", and "ratio H/D" are in accordance with the description of the present specification described above. On the other hand, in Tables 1 and 2, "dimension Tw (mm)" means a dimension between the first reference point P1 and the tread surface position P1' illustrated in FIG. 1. "Presence of groove" means the presence or absence of a groove in two regions in the tire width direction indicated by 0.3 Tr in FIG. 5. "Dimension along profile of wide belt layer" means a dimension along the profile of the wide belt layer 26b illustrated in FIG. 1 with respect to the dimension Tr. The reference signs and the like included in these terms are in accordance with the descriptions described above in the present specification.

The tires according to Examples 1 to 11 and the tire according to Conventional Example manufactured in this manner were evaluated for uneven wear resistance performance in accordance with the following procedures.

Uneven Wear Resistance Performance

Specifically, each test tire was mounted on a rim having a size of 22.5×8.25, inflated to a 760 kPa and mounted on the front axle of a tractor, and a test run was conducted. Then, a travel distance at which shoulder uneven wear occurred in the tread surface position P1' illustrated in FIG. 1 was measured and expressed as an index value and evaluated with the travel distance of Conventional Example as 100 (reference). The results are shown in Tables 1 and 2. Larger values indicate superior uneven wear resistance performance.

TABLE 1

|  | Conventional Example | Example 1 | Example 2 | Example 3 | Example 4 | Example 5 |
|---|---|---|---|---|---|---|
| Inclination angle 1 (°) | −10 | −3 | −3 | −3 | −3 | −3 |
| Inclination angle 2 (°) | −5 | −5 | −3 | −3 | −3 | −3 |
| Inclination angle 3 (°) | 4 | 4 | 4 | 3 | 3 | 3 |
| Inclination angle 4 (°) | 4 | 4 | 4 | 4 | 3 | 3 |
| Inclination angle 5 (°) | 11 | 11 | 11 | 11 | 11 | 10 |
| Dimension Tw (mm) | 55 | 55 | 55 | 55 | 55 | 55 |
| Presence of groove | No | No | No | No | No | No |
| Ratio H/C | — | — | — | — | — | — |
| Ratio H/D | — | — | — | — | — | — |
| Dimension along profile of wide belt layer | 0.75 × Tr | 0.75 × Tr | 0.75 × Tr | 0.75 × Tr | 0.75 × Tr | 0.75 × Tr |
| Elongation at break of tread rubber (%) | 270 | 270 | 270 | 270 | 270 | 270 |
| Carcass cord type | Nylon | Nylon | Nylon | Nylon | Nylon | Nylon |
| Regular internal pressure (kPa) | 450 | 450 | 450 | 450 | 450 | 450 |
| Uneven wear resistance performance | 100 | 105 | 110 | 112 | 114 | 115 |

TABLE 2

|  | Example 6 | Example 7 | Example 8 | Example 9 | Example 10 | Example 11 |
|---|---|---|---|---|---|---|
| Inclination angle 1 (°) | −3 | −3 | −3 | −3 | −3 | −3 |
| Inclination angle 2 (°) | −3 | −3 | −3 | −3 | −3 | −3 |
| Inclination angle 3 (°) | 3 | 3 | 3 | 3 | 3 | 3 |
| Inclination angle 4 (°) | 3 | 3 | 3 | 3 | 3 | 3 |
| Inclination angle 5 (°) | 10 | 10 | 10 | 10 | 10 | 10 |
| Dimension Tw (mm) | 45 | 45 | 45 | 45 | 45 | 45 |
| Presence of groove | No | Yes | Yes | Yes | Yes | Yes |
| Ratio H/C | — | 0.9 | 1.1 | 1.1 | 1.1 | 1.1 |
| Ratio H/D | — | 0.4 | 0.6 | 0.6 | 0.6 | 0.6 |
| Dimension along profile of wide belt layer | 0.75 × Tr | 0.75 × Tr | 0.85 × Tr | 0.85 × Tr | 0.85 × Tr | 0.85 × Tr |
| Elongation at break of tread rubber (%) | 270 | 270 | 270 | 300 | 300 | 300 |

TABLE 2-continued

|  | Example 6 | Example 7 | Example 8 | Example 9 | Example 10 | Example 11 |
|---|---|---|---|---|---|---|
| Carcass cord type | Nylon | Nylon | Nylon | Nylon | Steel | Steel |
| Regular internal pressure (kPa) | 450 | 450 | 450 | 450 | 450 | 500 |
| Uneven wear resistance performance | 117 | 120 | 125 | 127 | 130 | 140 |

According to Tables 1 and 2, each of the tires of Examples 1 to 11, which belong to the technical scope of the present technology (that is, in which the inclination angle with respect to the tire width direction of the carcass cord of the outermost carcass layer in the tire radial direction and adjacent to a belt layer has been improved), has improved uneven wear resistance performance as compared to the tire of Conventional Example which does not belong to the technical scope of the present technology.

The invention claimed is:

1. A tire, comprising:
a carcass made of at least one carcass layer; and
a belt comprising a first belt layer and a second belt layer disposed on an outer side of the first belt layer in a radial direction, the first belt layer comprising a cord extending from an inner side toward an outer side in a tire width direction on one side in a tire circumferential direction, the second belt layer comprising a cord extending from the inner side toward the outer side in the tire width direction on another side in the tire circumferential direction;
when, in a tire see-through plan view, an inclination angle of the cord included in the second belt layer with respect to the tire width direction is defined as a positive inclination angle,
in a tire meridian cross-sectional view, an intersection point between a perpendicular line drawn from an end portion of a belt layer having a maximum belt width in the tire width direction to the carcass and a cord of an outermost carcass layer in a tire radial direction is defined as a first reference point, and
in the tire see-through plan view, an inclination angle of the cord of the outermost carcass layer with respect to the tire width direction at the first reference point being more than 0° on each side in the tire width direction;
wherein when, in the tire meridian cross-sectional view, a dimension along a tire profile from a tire equatorial plane to a tread surface position identical to a position of the first reference point in the tire width direction is defined as Tr, a point on an inner side by 0.1 Tr in the tire width direction from the first reference point along a profile of the carcass is defined as a second reference point, and a center region is defined between the second reference point on each side of the tire, the inclination angle of the cord of the outermost carcass layer is constant and parallel to the tire width direction across a majority of the center region including at the tire equatorial plane;
the belt layer having the maximum belt width in the tire width direction extends continuously between the first reference point on each side of the tire;
a groove is formed in a region in the tire width direction from a position on an inner side by 0.3 Tr in the tire width direction from the tread surface position along the tire profile to a position on an outer side by 0.3 Tr in the tire width direction from the tread surface position along the tire profile; and
when, in the tire meridian cross-sectional view, a point on an outer side by 0.1 Tr in the tire width direction from the first reference point along the profile of the carcass is defined as a third reference point,
in the tire see-through plan view, an inclination angle of the cord of the outermost carcass layer in the tire radial direction with respect to the tire width direction in a region at least from the second reference point to the third reference point in the tire width direction is −3° or more and 10° or less.

2. The tire according to claim 1, wherein when, in the tire meridian cross-sectional view, a point on the outer side by 0.1 Tr in the tire width direction from the first reference point along the profile of the carcass is defined as a third reference point, and a maximum width position of the outermost carcass layer in the tire radial direction is defined as a fourth reference point, in the tire see-through plan view, an inclination angle of the cord of the outermost carcass layer in the tire radial direction with respect to the tire width direction in a region in the tire width direction from the third reference point to the fourth reference point on the one side from the tire equatorial plane as the boundary is −3° or more and 3° or less relative to an inclination angle of the cord of the outermost carcass layer with respect to the tire width direction at a position of the third reference point in the tire width direction on the one side from the tire equatorial plane as the boundary, and an inclination angle of the cord of the outermost carcass layer in the tire radial direction with respect to the tire width direction in a region in the tire width direction from an other third reference point to an other fourth reference point on the other side from the tire equatorial plane as the boundary is −3° or more and 3° or less relative to an inclination angle of the cord of the outermost carcass layer with respect to the tire width direction at a position of the other third reference point in the tire width direction on the other side from the tire equatorial plane as the boundary.

3. The tire according to claim 1, wherein a dimension Tw from the first reference point to a tread surface along the tire radial direction is 50 mm or less.

4. The tire according to claim 1, wherein when, in the tire meridian cross-sectional view, a narrow groove extending in the tire circumferential direction is formed as an opening end on an outer side of a tread surface position in the tire width direction,
and when the tire profile of the tread surface position on an inner side in the tire width direction is extended to an outer side in the tire width direction and defined as a tread surface position extension line, a dimension H from a groove bottom of the narrow groove to a foot of a perpendicular line to the tread surface position extension line SS, a dimension C from the groove bottom of the narrow groove to an end portion in the tire width direction of a cross belt layer that is widest, and a dimension D from the groove bottom of the narrow groove to the first reference point satisfy 1.0≤H/C≤2.0 and 0.5≤H/D≤1.5, and a dimension along a profile of a belt layer that is wider among the first belt layer and the second belt layer is 0.80 Tr or more and 1.20 Tr or less.

5. The tire according to claim 1, wherein an elongation at break of tread rubber constituting a tread portion is 300% or more.

6. The tire according to claim 1, wherein the cord constituting the at least one carcass layer is a steel cord.

7. The tire according to claim 1, wherein a regular internal pressure is 500 kPa or more.

8. The tire according to claim 1, wherein in the tire see-through plan view, an absolute value of the inclination angle of the cord of the carcass with respect to the tire width direction at the first reference point is equal to or less than an average value of an absolute value of an inclination angle of the cord of the first belt layer with respect to the tire circumferential direction and an absolute value of the inclination angle of the cord of the second belt layer with respect to the tire circumferential direction.

9. The tire according to claim 8, wherein
in the tire see-through plan view, an inclination angle of the cord of the outermost carcass layer in the tire radial direction with respect to the tire width direction in a region in the tire width direction between the second reference point on one side from the tire equatorial plane as a boundary in the tire width direction and an other second reference point on another side from the tire equatorial plane as the boundary in the tire width direction is −3° or more and 3° or less relative to an average value of an inclination angle of the cord of the outermost carcass layer with respect to the tire width direction at a position of the second reference point in the tire width direction and an inclination angle of the cord of the outermost carcass layer with respect to the tire width direction at a position of the other second reference point in the tire width direction.

10. The tire according to claim 9, wherein when, in the tire meridian cross-sectional view, a point on the outer side by 0.1 Tr in the tire width direction from the first reference point along the profile of the carcass is defined as the third reference point, and a maximum width position of the outermost carcass layer in the tire radial direction is defined as a fourth reference point, in the tire see-through plan view, an inclination angle of the cord of the outermost carcass layer in the tire radial direction with respect to the tire width direction in a region in the tire width direction from the third reference point to the fourth reference point on the one side from the tire equatorial plane as the boundary is −3° or more and 3° or less relative to an inclination angle of the cord of the outermost carcass layer with respect to the tire width direction at a position of the third reference point in the tire width direction on the one side from the tire equatorial plane as the boundary, and an inclination angle of the cord of the outermost carcass layer in the tire radial direction with respect to the tire width direction in a region in the tire width direction from an other third reference point to an other fourth reference point on the other side from the tire equatorial plane as the boundary is −3° or more and 3° or less relative to an inclination angle of the cord of the outermost carcass layer with respect to the tire width direction at a position of the other third reference point in the tire width direction on the other side from the tire equatorial plane as the boundary.

11. The tire according to claim 10, wherein when, in the tire meridian cross-sectional view, a point on the outer side by 0.1 Tr in the tire width direction from the first reference point along the profile of the carcass is defined as the third reference point, and the maximum width position of the outermost carcass layer in the tire radial direction is defined as the fourth reference point,
in the tire see-through plan view, an average value of inclination angles of the cord of the outermost carcass layer in the tire radial direction with respect to the tire width direction in the region in the tire width direction between the second reference point on the one side from the tire equatorial plane as the boundary in the tire width direction and the other second reference point on the other side from the tire equatorial plane as the boundary in the tire width direction is −10° or more and 10° or less relative to an average value of inclination angles of the cord of the outermost carcass layer with respect to the tire width direction in the region from the third reference point to the fourth reference point in the tire width direction on the one side from the tire equatorial plane as the boundary in the tire width direction and relative to an average value of inclination angles of the cord of the outermost carcass layer with respect to the tire width direction in the region from the other third reference point to the other fourth reference point in the tire width direction on the other side from the tire equatorial plane as the boundary in the tire width direction.

12. The tire according to claim 11, wherein a dimension Tw from the first reference point to a tread surface along the tire radial direction is 50 mm or less.

13. The tire according to claim 12, wherein when, in the tire meridian cross-sectional view, a narrow groove extending in the tire circumferential direction is formed as an opening end on an outer side of the tread surface position in the tire width direction,
and when the tire profile of the tread surface position on an inner side in the tire width direction is extended to an outer side in the tire width direction and defined as a tread surface position extension line, a dimension H from a groove bottom of the narrow groove to a foot of a perpendicular line to the tread surface position extension line SS, a dimension C from the groove bottom of the narrow groove to an end portion in the tire width direction of a cross belt layer that is widest, and a dimension D from the groove bottom of the narrow groove to the first reference point satisfy 1.0≤H/C≤2.0 and 0.5≤H/D≤1.5, and a dimension along a profile of a belt layer that is wider among the first belt layer and the second belt layer is 0.80 Tr or more and 1.20 Tr or less.

14. The tire according to claim 13, wherein an elongation at break of tread rubber constituting a tread portion is 300% or more.

15. A tire, comprising:
a carcass made of at least one carcass layer; and
a belt comprising a first belt layer and a second belt layer disposed on an outer side of the first belt layer in a radial direction, the first belt layer comprising a cord extending from an inner side toward an outer side in a tire width direction on one side in a tire circumferential direction, the second belt layer comprising a cord extending from the inner side toward the outer side in the tire width direction on another side in the tire circumferential direction;

when, in a tire see-through plan view, an inclination angle of the cord included in the second belt layer with respect to the tire width direction is defined as a positive inclination angle, in a tire meridian cross-sectional view, an intersection point between a perpendicular line drawn from an end portion of a belt layer having a maximum belt width in the tire width direction to the carcass and a cord of an outermost carcass layer in a tire radial direction is defined as a first reference point, and in the tire see-through plan view, an inclination angle of the cord of the outermost carcass layer with respect to the tire width direction at the first reference point being more than 0° on each side in the tire width direction;

wherein when, in the tire meridian cross-sectional view, a dimension along a tire profile from a tire equatorial plane to a tread surface position identical to a position of the first reference point in the tire width direction is defined as Tr, a point on an inner side by 0.1 Tr in the tire width direction from the first reference point along a profile of the carcass is defined as a second reference point, and a center region is defined between the second reference point on each side of the tire, the inclination angle of the cord of the outermost carcass layer is constant and parallel to the tire width direction across a majority of the center region including at the tire equatorial plane;

the belt layer having the maximum belt width in the tire width direction extends continuously between the first reference point on each side of the tire;

a groove is formed in a region in the tire width direction from a position on an inner side by 0.3 Tr in the tire width direction from the tread surface position along the tire profile to a position on an outer side by 0.3 Tr in the tire width direction from the tread surface position along the tire profile;

in the tire see-through plan view, an inclination angle of the cord of the outermost carcass layer in the tire radial direction with respect to the tire width direction in a region in the tire width direction between the second reference point on one side from the tire equatorial plane as a boundary in the tire width direction and an other second reference point on another side from the tire equatorial plane as the boundary in the tire width direction is −3° or more and 3° or less relative to an average value of an inclination angle of the cord of the outermost carcass layer with respect to the tire width direction at a position of the second reference point in the tire width direction and an inclination angle of the cord of the outermost carcass layer with respect to the tire width direction at a position of the other second reference point in the tire width direction.

16. A tire, comprising:

a carcass made of at least one carcass layer; and a belt comprising a first belt layer and a second belt layer disposed on an outer side of the first belt layer in a radial direction, the first belt layer comprising a cord extending from an inner side toward an outer side in a tire width direction on one side in a tire circumferential direction, the second belt layer comprising a cord extending from the inner side toward the outer side in the tire width direction on another side in the tire circumferential direction;

when, in a tire see-through plan view, an inclination angle of the cord included in the second belt layer with respect to the tire width direction is defined as a positive inclination angle, in a tire meridian cross-sectional view, an intersection point between a perpendicular line drawn from an end portion of a belt layer having a maximum belt width in the tire width direction to the carcass and a cord of an outermost carcass layer in a tire radial direction is defined as a first reference point, and in the tire see-through plan view, an inclination angle of the cord of the outermost carcass layer with respect to the tire width direction at the first reference point being more than 0° on each side in the tire width direction;

wherein when, in the tire meridian cross-sectional view, a dimension along a tire profile from a tire equatorial plane to a tread surface position identical to a position of the first reference point in the tire width direction is defined as Tr, a point on an inner side by 0.1 Tr in the tire width direction from the first reference point along a profile of the carcass is defined as a second reference point, and a center region is defined between the second reference point on each side of the tire, the inclination angle of the cord of the outermost carcass layer is constant and parallel to the tire width direction across a majority of the center region including at the tire equatorial plane;

the belt layer having the maximum belt width in the tire width direction extends continuously between the first reference point on each side of the tire;

a groove is formed in a region in the tire width direction from a position on an inner side by 0.3 Tr in the tire width direction from the tread surface position along the tire profile to a position on an outer side by 0.3 Tr in the tire width direction from the tread surface position along the tire profile; and when, in the tire meridian cross-sectional view, a point on the outer side by 0.1 Tr in the tire width direction from the first reference point along the profile of the carcass is defined as a third reference point, and a maximum width position of the outermost carcass layer in the tire radial direction is defined as a fourth reference point, in the tire see-through plan view, an average value of inclination angles of the cord of the outermost carcass layer in the tire radial direction with respect to the tire width direction in a region in the tire width direction between the second reference point on the one side from the tire equatorial plane as the boundary in the tire width direction and an other second reference point on the other side from the tire equatorial plane as the boundary in the tire width direction is −10° or more and 10° or less relative to an average value of inclination angles of the cord of the outermost carcass layer with respect to the tire width direction in a region from the third reference point to the fourth reference point in the tire width direction on the one side from the tire equatorial plane as the boundary in the tire width direction and relative to an average value of inclination angles of the cord of the outermost carcass layer with respect to the tire width direction in a region from an other third reference point to an other fourth reference point in the tire width direction on the other side from the tire equatorial plane as the boundary in the tire width direction.

* * * * *